US012770330B2

(12) United States Patent
Lee

(10) Patent No.: US 12,770,330 B2
(45) **Date of Patent: *Oct. 20, 2026**

(54) IMMERSIVE INTERACTIVE LIVE DIGITAL TWIN OF AN INDOOR AREA

(71) Applicant: Seng Fook Lee, Singapore (SG)

(72) Inventor: Seng Fook Lee, Singapore (SG)

(73) Assignee: Polytron.AI Pte. Ltd., Singapore (SG)

( * ) Notice: Subject to any disclaimer, the term of this patent is extended or adjusted under 35 U.S.C. 154(b) by 92 days.

This patent is subject to a terminal disclaimer.

(21) Appl. No.: 18/769,378

(22) Filed: Jul. 10, 2024

(65) Prior Publication Data

US 2025/0022227 A1 Jan. 16, 2025

Related U.S. Application Data

(63) Continuation-in-part of application No. 18/646,820, filed on Apr. 26, 2024.

(60) Provisional application No. 63/512,663, filed on Jul. 10, 2023.

(51) Int. Cl.
*G06T 17/20* (2006.01)
*H04N 21/2187* (2011.01)

(52) U.S. Cl.
CPC ......... *G06T 17/20* (2013.01); *H04N 21/2187* (2013.01)

(58) Field of Classification Search
CPC .... G06T 17/20; G06T 19/003; H04N 21/2187
See application file for complete search history.

(56) References Cited

U.S. PATENT DOCUMENTS

| | | | | |
|---|---|---|---|---|
| 2019/0391716 A1* | 12/2019 | Badr | G08C 17/02 |
| 2021/0074062 A1* | 3/2021 | Madonna | G06F 3/011 |
| 2023/0236493 A1* | 7/2023 | Muir | G03B 37/04 396/332 |

* cited by examiner

*Primary Examiner* — Chong Wu
(74) *Attorney, Agent, or Firm* — Horizon IP Pte. Ltd.

(57) ABSTRACT

Immersive interactive live digital twins of an area are disclosed. The immersive interactive live digital twin is produced by scanning the indoor area to obtain a static 3D model of the indoor area. Live feeds of the indoor area are stitched to the static 3D model to produce a live digital twin of the area which a user can navigate through different parts thereof. The live digital twin may include action bottoms for interacting with elements of the live digital twin.

20 Claims, 24 Drawing Sheets

100

102

102

102

103

310

307

305

407

470

407

446

407

446

470

446

407

IMMERSIVE INTERACTIVE LIVE DIGITAL TWIN OF AN INDOOR AREA

CROSS-REFERENCE TO RELATED APPLICATION

This application claims the benefit of provisional application, Titled "INTERACTIVE LIVE DIGITAL TWIN OF AN INDOOR AREA", having Application No. 63/512,663, which was filed on Jul. 10, 2023. This application is also a continuation-in-part of co-pending application, Titled "IMMERSIVE LIVE DIGITAL TWIN OF AN INDOOR AREA", having application Ser. No. 18/646,820, which was filed on Apr. 26, 2024. The disclosures of above said references are incorporated herein by reference in their entireties for all purposes.

FIELD OF THE INVENTION

The present disclosure generally relates to generating a 3D model of an area. In particular, the disclosure relates to the generation of a live 3D Tour of an area which enables a user to immersively and interactively experience the area virtually as if the user were physically there in real-time. More particularly, the area is an indoor area.

BACKGROUND 3D modeling of an area generally includes scanning the area to create a point cloud, transforming the point cloud to a mesh model, texturing the mesh model, and rendering the textured mesh model to generate the 3D model. Conventionally 3D models are static models. For example, the 3D models are based on what was originally scanned. Although the 3D model can be manipulated, it nevertheless remains based on what was originally scanned. In other words, the 3D models do not depict the modeled area in real-time. In other words, the model is not a live 3D model, but instead is a static 3D model.

From the foregoing disclosure, there is a desire to provide real-time live 3D models of an area.

SUMMARY

Real-time live 3D models are disclosed. In one embodiment, a system for displaying an immersive interactive live digital twin of an indoor area is disclosed. The system includes a static digital twin module. The static digital twin module includes a static digital twin model of the indoor area. The system also includes an input module. The input module is configured to receive live feeds of the indoor area from a plurality of cameras located in the indoor area. The system also includes an integration module. The integration module is configured to stitch the live feeds of the indoor area to the static digital twin model to create the immersive live digital twin. The system also includes an interactive area disposed in the digital twin model. The interactive area includes an action button for controlling an interactive component. The live feeds capture the interactive component being controlled by a user when the action button is selected. The system also includes a display module for displaying the immersive live digital twin to provide a user with the perception that the user is immersed with the immersive live digital twin. The system further includes a navigation module to navigate to different parts of the immersive live digital twin.

In another embodiment, a method for generating an immersive interactive live digital twin of an indoor area is disclosed. The method includes scanning the indoor area to create a static digital twin model of the indoor area. The static digital twin includes an interactive area with an action button for controlling an interactive component. The method also includes obtaining live feeds of the indoor area from a plurality of cameras located in the indoor area. The method also includes stitching the live feeds to the static digital twin model to create the immersive live digital twin of the indoor area. The method also includes displaying the immersive live digital twin where a user is immersed within the immersive live digital twin. The method also includes navigating through the immersive live digital twin to different parts of the module to navigate to different parts of the indoor area. The method further includes selecting the action button to control the interactive component. The live feeds capture the interactive component being controlled.

These and other advantages and features of the embodiments herein disclosed will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various embodiments. In the following description, various embodiments of the present disclosure are described with reference to the following, in which.

DETAILED DESCRIPTION

Figure 1A:
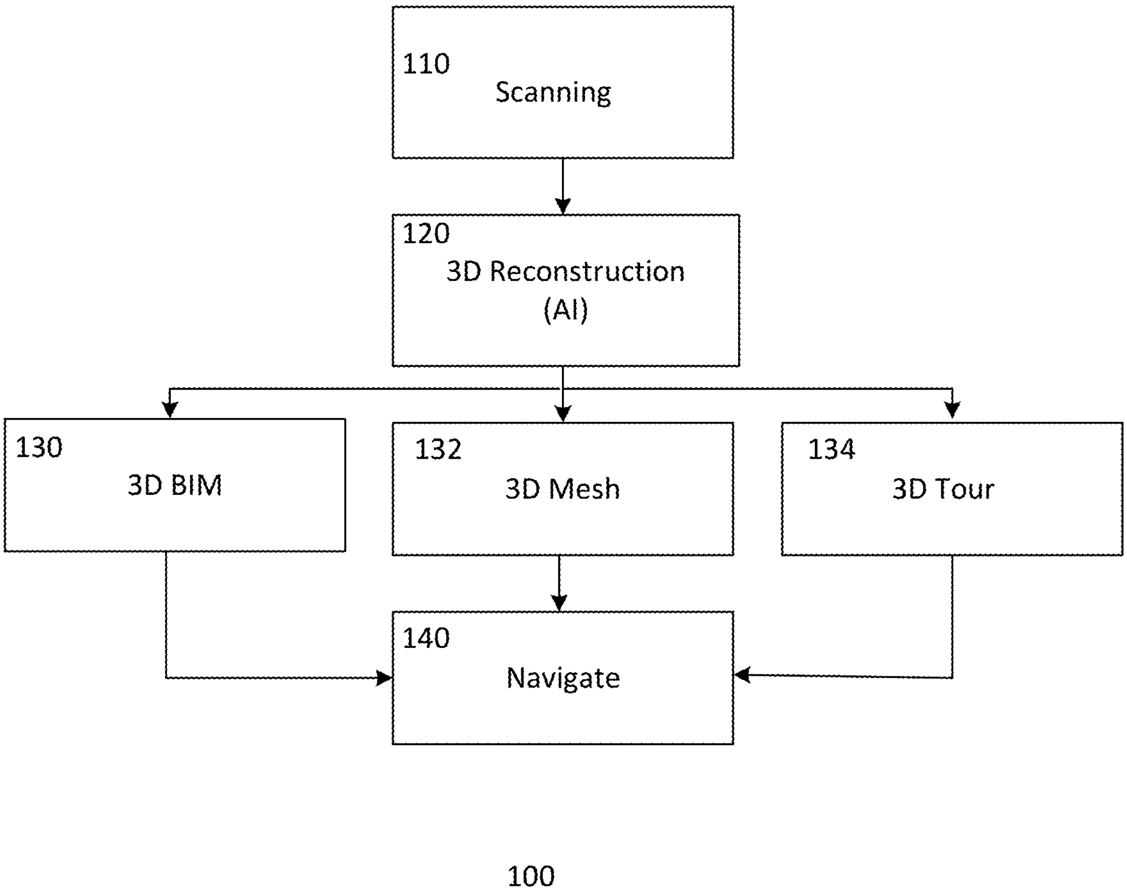
FIG. 1*a* shows a simplified process flow for generating a 3D digital replica or twin of a location or area.

Embodiments relate to generating a 3D digital replica or twin of a location or area. The location, in one embodiment, is an indoor area such as an office or building. The building may have a single floor or multiple floors. Other types of indoor areas may also be useful. In other embodiments, the location may be an outdoor area.

In one embodiment, video feeds of the area are merged or stitched into a digital model to produce a unified 3D reconstruction of the area, resulting in a 3D digital replica. A user can virtually tour the digital replica. For example, the user can navigate to any position within the digital replica and view of that position of the digital replica as if the user were standing there. The user may turn and view the area from the position. This gives the user a 3D immersive experience from a specific position of the digital replica. For example, the user may navigate to any position within the digital replica and see everything surrounding the user animated. This produces a realistic 3D immersive tour of the area In another embodiment, the video feeds are live video feeds which are stitched to the digital model. This produces a real-time immersive 3D virtual tour of the location. With real-time video feeds stitched, the user can see exactly what is going on in real-time, as if the user were physically there at that time. For example, the user may navigate to any position within the digital replica and see everything surrounding the user animated and in real-time. This includes people who are at the location and what they are doing in real-time. Of course, when we refer to real-time, there may be delays related to processing (e.g., merging the video feeds) and data transmission. Other delays may also be included. However, such delays may be considered negligible. For example, the 3D real-time virtual tour of the replica may still be considered real-time or essentially real-time. Real-time may refer to real-time or near real-time, for example, delay due to processing. The digital replica with the live video feeds may be referred to as a live digital twin, giving the experience of being physically there at that moment in time.

In another embodiment, the real-time virtual 3D tour is a real-time interactive virtual 3D tour. For example, a user may interact with elements or components of the area. This, for example, may include a robot, a television, a door or other components of the area. Hot or web buttons may be included in the tour for a user to interact with a component associated with a web button.

The immersive experience not only blurs the lines between virtual and physical realms but also enhances user engagement, making one feel genuinely present in the explored location. Furthermore, the immersive, the immersive real-time and the immersive real-time interactive experiences provide a groundbreaking shift as to how a user interacts with and experiences a virtual space, offering a unique and immersive way to explore the world without ever leaving the comfort of your device.

To create the 3D digital replica, a 3D digital model of the indoor area is created. The digital model may be created by scanning the indoor area completely. For example, the digital model is a 3D digital model of the complete area. Video feeds are merged with the digital model to create a static 3D digital replica of the area. This, for example, produces a static tour model through which the user can navigate. Live video feeds may be merged with the digital model to create a real-time 3D digital replica of the area. The real-time digital replica depicts what is occurring in the area in real-time. The stitching may be continuously performed in the background as the live feeds are received.

FIG. 1*a* shows a simplified process flow 100 for generating a 3D digital replica or twin of a location or area. The process flow commences at 110 by scanning the indoor location. The scanning, for example, is performed in a central position of the indoor area, such as a room. The scanning is a 360° scan of the indoor location, including above and below, such as the ceiling and the floor. The scanning detects all objects within the indoor location. In one embodiment, the scanning is performed using a LiDar type or 360° camera. The scan produces depth and RGB imagery. Other types of RGB or RGBD cameras may also be used. The scanning, for example, generates a depth map of the scanned space. The scanning may be repeated for other areas of the location, such as other rooms of a floor of a building, other floors of the building, stairwells of the building, elevators of the building, as well as other areas of the building.

After scanning is completed, a 3D reconstruction of the scan data is performed at 120. The reconstruction, for example, utilizes artificial intelligence (AI) to reconstruct the scan data. For example, the reconstruction process includes processing the data to generate point clouds. The point clouds are used to create 3D models of the scan space or spaces. The different scans, for example, generate data for the different spaces and are processed using AI to form an overall reconstruction of the area of interest. The area of interest may be from a single scan or multiple scans. For example, the area of interest may be a room, an office space, a floor of a building, floors of a building or all floors of a building. Other areas of interest may also be useful. The point clouds are used to generate a 3D BIM model at 130, a 3D mesh model at 132 and a 3D tour model at 134. The various models are different 3D digital representations or replicas of the scanned space or area of interest. For example, different texturing are employed to generate the different 3D models.

Figure 1B:
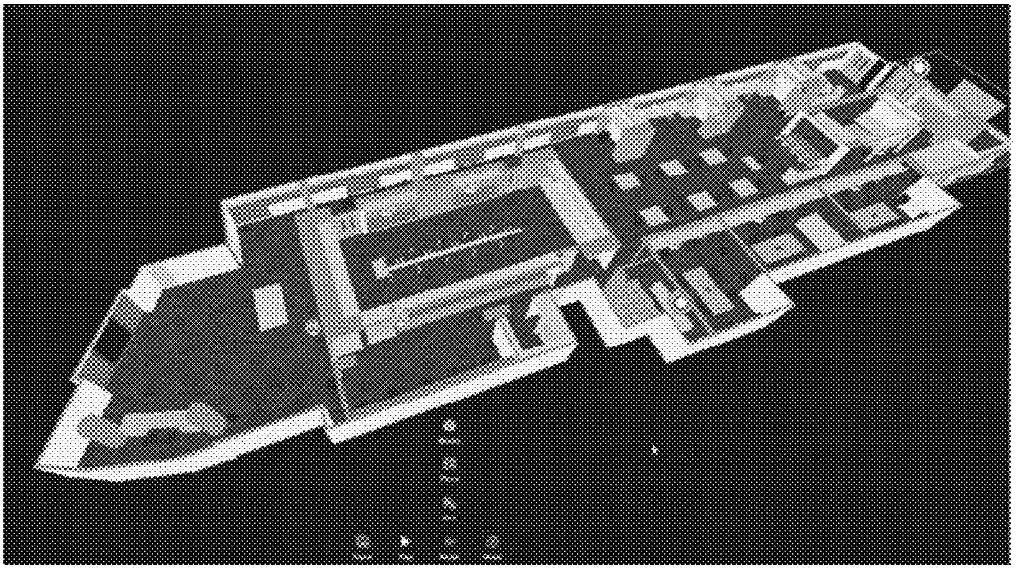
FIG. 1*b* shows an exemplary Building Information Modeling (BIM) model of an area of interest.

In one embodiment, the BIM model is a basic 3D model of the scanned area of interest. FIG. 1*b* shows an exemplary BIM model 102 of an area of interest. As shown, the BIM model includes basic texturing. Basic texturing, for example, shows different aspects or elements of the model. A control panel may be included in the interface which displays the BIM model to navigate the model as well as the system. The control panel, for example, may include various options for a user to switch to different models, and move from one section of the area to another, as well as other options.

Figure 1C:
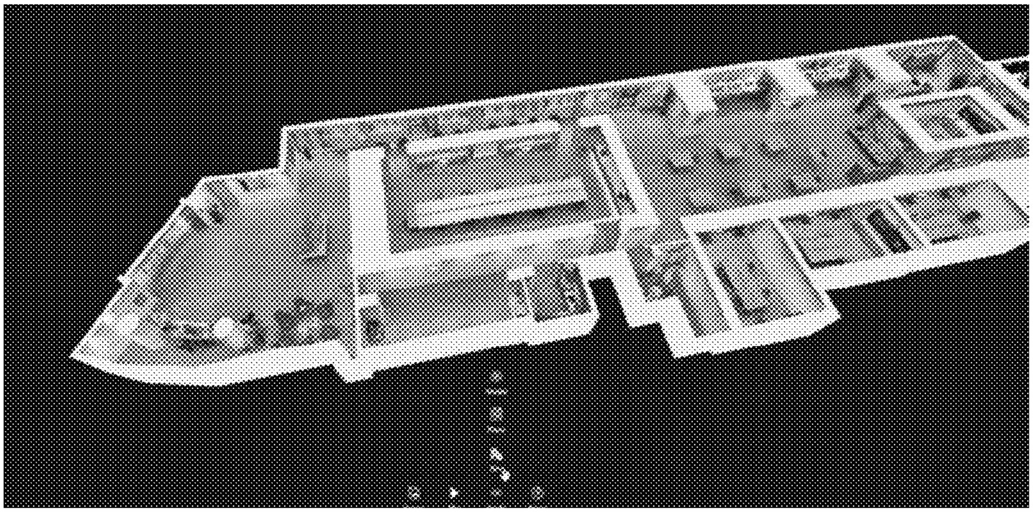
FIG. 1*c* shows an exemplary 3D mesh model.

FIG. 1*c* shows an exemplary 3D mesh model 103 which has been textured. Compared to the BIM model, the mesh model is more realistic. For example, the texturing for the 3D mesh model is more detailed.

Figure 1D:
FIG. 1*d* shows a tour model.

FIG. 1*d* shows a 3D tour model 104. In one embodiment, the tour model is a basic tour model. The basic tour model, for example, includes stitched videos of the area of interest. The various models are 3D digital twins with different levels of texturing.

In one embodiment, a user may navigate to different parts of the area of interest using any of the models at 140. For example, each model may include a control panel to switch from one model to another as well as to migrate from one position to another. In addition, a user may zoom in or zoom out (e.g., moving closer or farther away). Migrating from one position to another may also be achieved using the pointer or mouse to move and select the desired position.

In one embodiment, immersive locations are dispersed within the indoor area to generate the real-time 3D tour model. The immersive locations include cameras for providing live video feeds for processing to generate the real-time 3D tour model. A user may navigate to an immersive location at which the user would view the area as if the user were standing there. For example, a user may view 360° outwardly from the immersive location. Live video feeds from the immersive camera are merged with the 3D model. The 3D model merged with the live video feeds may be referred to as a real-time or live immersive digital twin of the area.

In one embodiment, video fusion is employed to merge multiple video feeds from the immersive locations with the 3D model to produce a coherent 3D scene. A video fusion module of the system is configured to fuse the multiple video feeds with the 3D model. The video fusion module, in one embodiment, includes an end-to-end deep learning architecture that fuses dynamic 3D geometry and video texture for real-time navigation. The deep learning architecture is configured to predict depth from video or imagery and create 3D spatial geometry therefrom.

In one embodiment, the video fusion module merges video data captured from the different which is then streamed in real-time into a 3D scene. This innovative approach merges real-time video footage with 3D digital twin, allowing for dynamic and immersive visualizations. As the 360-degree camera captures a complete panoramic view, it provides a comprehensive perspective of the surroundings. This footage is seamlessly integrated into the 3D scene, for example, at 60 FPS, ensuring that viewers can experience a real-time and realistic depiction of the environment.

Furthermore, the present technology may be applied to other applications, such as real-time surveillance and augmented reality systems. The real-time streaming capability means that changes in the physical environment are immediately reflected in the 3D scene, providing up-to-date information that facilitates decision-making in various fields, including urban planning, security, and entertainment.

In one embodiment, processing of the image data includes the techniques used to transform raw video feeds from, for example, a 360-degree camera into a structured 3D scene which involves dynamically updating the textures with video frames. For example, 3d video fusion is employed. Video fusion is a high-performance adaptive video texturing and rendering of a large 3D scene. For example, video fusion seamlessly integrates video content into a 3D model utilizing depth estimation, advanced spatial analysis such as segmentation, and motion tracking. The 3D model, for example, may be the mesh model. Other types of 3D models may also be useful.

Regarding depth estimation, this process involves determining the distance between the camera and objects in the video by calculating depth and detecting shapes. This is achieved by comparing differences between views from two cameras. For example, stereo vision is employed. By analyzing these differences or disparities, the system can construct a depth map that represents the distance of objects from the camera.

As for segmentation, it is performed on the depth map to distinguish and isolate various shapes and objects within the scene. Segmentation techniques classify different regions of the depth map, enabling the identification of distinct objects and their boundaries. This comprehensive approach not only enhances the accuracy of depth perception but also improves the recognition and understanding of complex scenes by dividing a video feed into segments that represent different objects or regions. Advanced machine learning models, such as convolutional neural networks (CNNs), are employed to recognize and categorize different areas of the image according to their characteristics.

Motion tracking involves monitoring the movement of objects over a sequence of video frames. Motion tracking may employ techniques designed to detect and track various points or features as they traverse through both space and time. For example, optical flow algorithms may be used to estimate the motion between two frames by observing the changes in pixel intensity, while feature-based tracking methods, such as the Kanade-Lucas-Tomasi (KLT) tracker, identify and follow key points through a video sequence. Motion tracking enables us to understand the dynamics of moving objects to "super-impose" the dynamically generated animated 3D scene.

By leveraging these AI tracking techniques on video streams, the system can generate a comprehensive map of object movements, meshing these animated objects into the 3D scene, and also enhancing its ability to predict future positions and interactions within the environment. For example, a 3D real-time environment can be created by mapping video textures onto a 3D mesh and point clouds.

Stitching video textures into 3D virtual tours involves the process of integrating video content onto 3D models to create immersive experiences. The use of 3D point clouds, geometry and panoramic videos in virtual tours allows for a more realistic and compelling presentation of properties, products, or environments, enhancing the overall user experience, and conveying a more visceral sense of "being there" while navigating in 3D Tour. This represents a groundbreaking advancement, unmatched by any current virtual tour technology available.

Figure 1E:
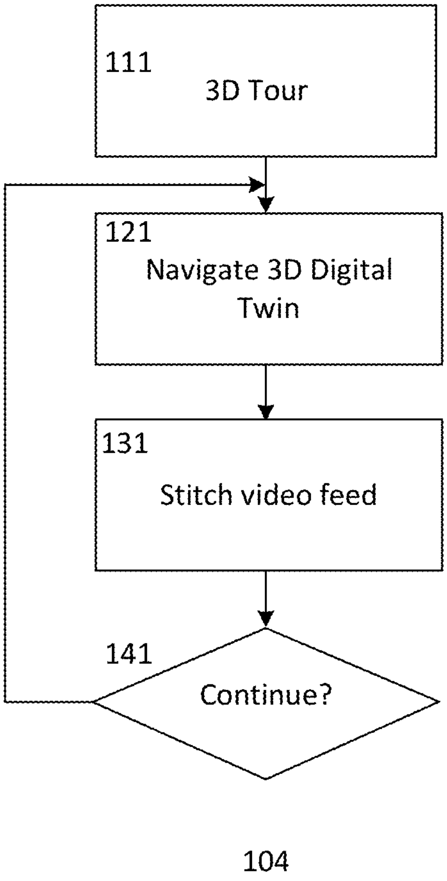
FIG. 1*e* shows a simplified process flow depicting a 3D tour by a user.

FIG. 1*e* shows a simplified process flow 104 depicting a 3D tour by a user. At 111, the 3D tour commences. The user may initiate a 3D tour of the area of interest on the 3D immersive system. The 3D immersive system, for example, may include a 3D immersive software running on a server. The server may be a backend server which a user can access over the internet. The server includes the various models. For example, the static 3D tour model, the BIM model and the mesh model. The server receives continuous live video feeds of the area of interest and stitches them to generate a live 3D tour model. The static 3D tour model is continuously updated by stitching the live video feeds to the model.

As discussed, in the live 3D tour model, live video feeds are stitched to the static 3D tour module. For example, the live 3D tour will show in real-time what is occurring in the selected area. For example, a user taking the live 3D tour may navigate the area. Where the user navigates to, will show what is occurring in real-time at that location. For example, if there are people, it will show the people. The stitching will also be able to provide the perspective, as selected by the user, of what is occurring in the selected area. Stitching, for example, may be performed using artificial intelligence (AI). The selected area will be displayed with the appropriate perspective as the user navigates the area using the live 3D tour.

In one embodiment, reduced processing by the AI can be achieved by selectively stitching the differential between the real-time and non-real-time videos. For example, only what is different from the non-real-time and real-time videos is stitched to the static 3D tour model. In another embodiment, only certain types of differentials are stitched. For example, differentials which are identified as people, animate objects mirrors, and windows are stitched. Other configurations of stitching the live video feeds to the static 3D model may also be useful.

The user may select a live or non-live tour. When a non-live tour is selected, the static 3D tour model is used. The user can navigate the static tour model. When a live tour is selected, the user navigates the live 3D tour model. The user can navigate to the desired position of the area of interest at 121. For example, the user can select a position within a room to view. For non-live, a pre-recorded video feed is stitched to the tour model 131. The user can view the area of interest for the selected position. In the case of a live 3D tour, a live video feed of the area of interest is stitched to the 3D tour model. This produces a live immersive experience for the user from the selected position.

At the selected position, the user may move around and view the surrounding area. For example, the user may navigate closer to an object at the selected position or turn to view a different direction of the surrounding area at the selected position. Video cameras are strategically located in the room to enable capturing the whole room from any position within the room and in any direction. For example, video cameras may be mounted on different parts of the walls of the room and/or on objects, such as lamps. The camera, for example, is a 360° camera. The camera can be equipped with telescopic lenses for effecting zooming in and out. Other configurations of cameras may also be useful. The cameras may be mounted on a swivel or rotating mount. The cameras may be mounted on rotatable mounts and are equipped with telephoto lenses for zooming in and out. In some cases, the cameras may be multi-directional cameras. Other configurations of cameras may also be useful.

Based on the location and direction which the user has selected, the system instructs the appropriate video feeds to stitch. For example, if the user moves towards an object, the camera may zoom in as the user is getting closer. If the user rotates and moves in another direction, the video feed or feeds capturing the view from the other direction are stitched. For example, feeds from more than one camera can be stitched. For example, the system is configured to stitch video feeds from any position and in any direction of the room or area. For example, as the user navigates from one position to another, the video feeds from the appropriate camera or cameras are stitched. The user may also continue to navigate within the room or to another area, such as another room at 141. The 3D tour continues until terminated by the user.

Figure 2A:
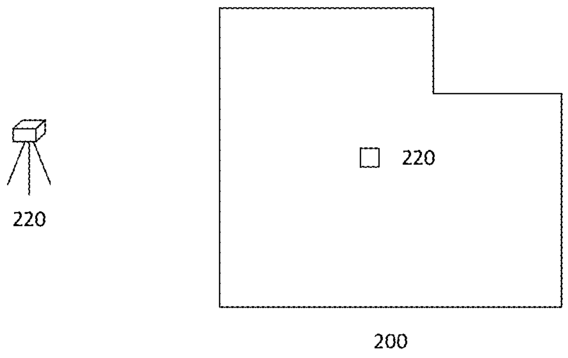
FIG. 2*a*-2*b* show top and perspective views of an area of interest.
Figure 2B:
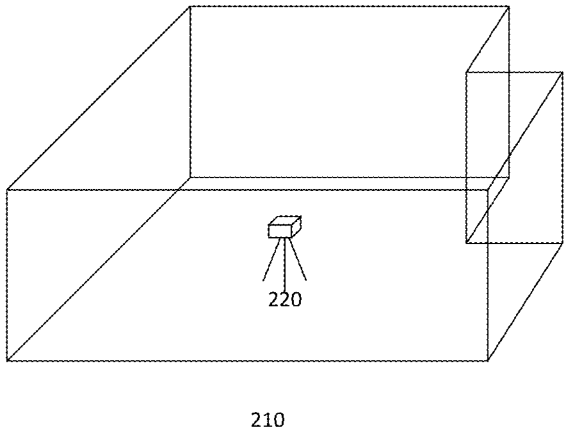

FIG. 2*a*-2*b* show top and perspective views of an area of interest 200, such as a room. A camera 220 may be placed, for example, near or at the center of the area. The camera, for example, performs a 360° scan of the area. The camera, for example, is a LiDar camera which detects the distances of objects captured, such as walls, ceilings, windows, tables, and columns as well as other types of objects. Other types of cameras may also be useful.

Figure 2C:
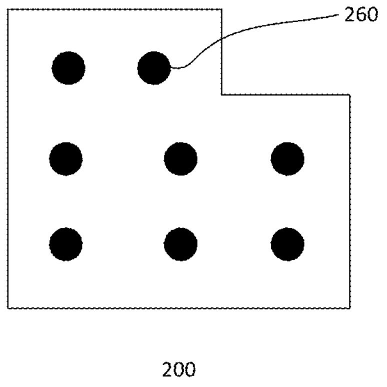
FIG. 2*c*-2*e* illustrates a top view of the indoor area.
Figure 2D:
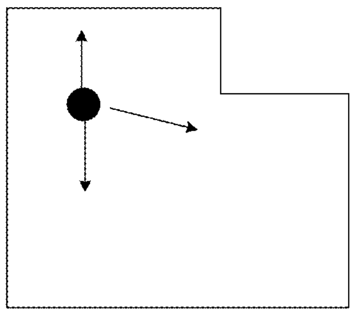
Figure 2E:
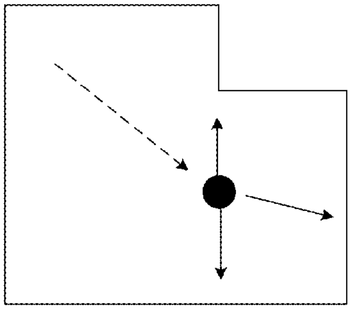

FIG. 2*c* illustrates a top view of the indoor area 200 with immersive locations 260 dispersed therein. For example, the cameras are disposed at immersive locations. The cameras provide pre-recorded or live videos to stitch to the tour model to provide an immersive or live immersive 3D tour. Other configurations of the cameras may also be useful. In one embodiment, the cameras are 360° cameras which generate live 360° videos or feeds, as illustrated by FIGS. 2*d*-2*e*.

FIGS. 3*a*-3*i* show various views of an embodiment of a digital twin system. The system, for example, displays various views on a system user interface (UI). For example, the views may be displayed on a computer display or monitor when the system is initiated. As shown, the views include various views or models of a scanned location 340, such as an office.

Figure 3A:
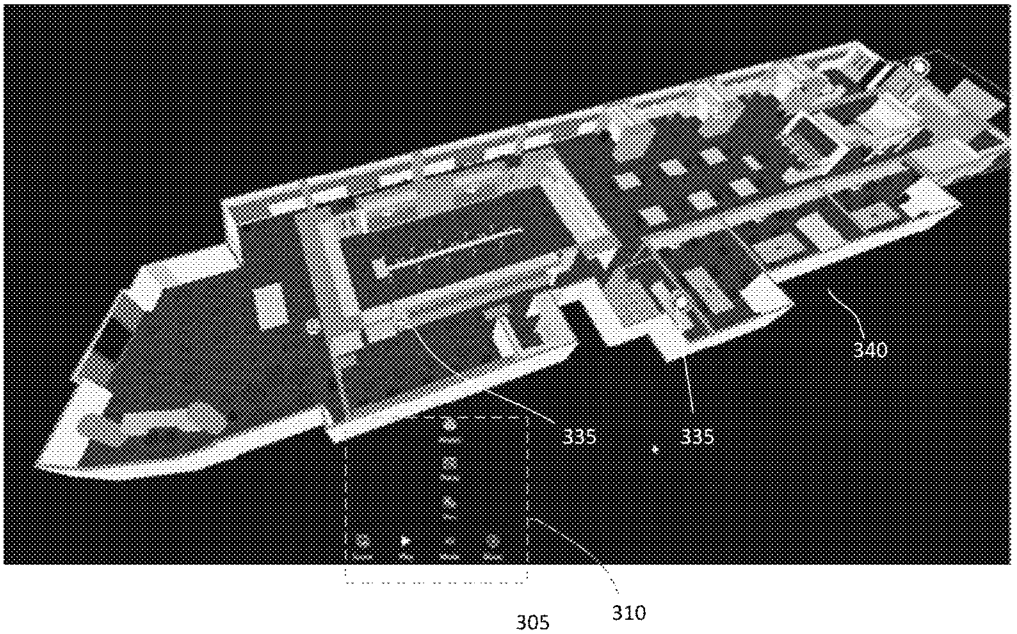
FIGS. 3*a*-3*i* show various views of an embodiment of a digital twin system.

Referring to FIG. 3*a*, a BIM model 305 of the office is shown. For example, the BIM model is generated from scanning data of the office. The BIM model may be displayed in a user interface of the digital twin system. As shown, the BIM model includes walls defining the interior space of the office. The office and various rooms or areas, such as work areas, meeting rooms, lobby, and offices. Other types of areas may also be included in the BIM model. The BIM model includes basic texturing. For example, colors and textures of different features of the office are generated. However, the texture is not high quality, resulting in the model.

A user may navigate to different areas or positions within the BIM model. To navigate to different areas or positions, a mouse may be employed. For example, the user may move the pointer using the mouse to the desired position and click to select. The selected area is displayed on the user interface in greater detail. The user may further look at different ports of the selected area using the mouse.

In addition, the BIM model may include action buttons or hot spots 335. A user may select a button using the mouse. For example, the user may navigate the cursor to the desired action button and click to select it. Selecting a button may generate a desired action.

Figure 3B:
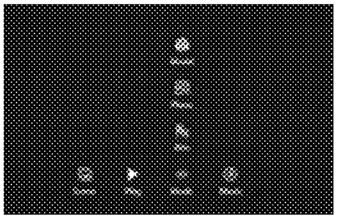

The user interface includes a control panel 310. The control panel includes various control buttons for the user to select. FIG. 3*b* shows a detailed view of the control panel 310. As shown, the control panel includes scene, play, mode and music control buttons. Other control buttons may also be provided. Each control button may include a submenu. For example, clicking on a control button shows a list of options within the control button.

Figure 3C:
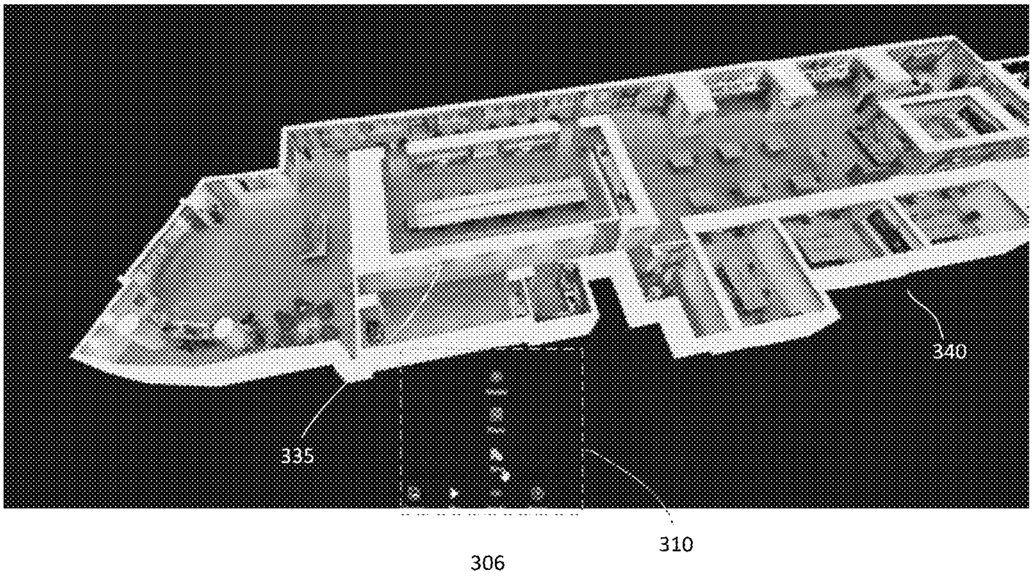

Referring to FIG. 3*c*, a mesh model 306 of the office 340 is shown. The mesh model is based on the scanned data used to generate the BIM model. The mesh model may be displayed on the user interface by selecting the model selection of the control button menu. The mesh model is textured. The texturing is more detailed compared to the BIM model, resulting in a more realistic model. Similar to the BIM model, the user may navigate to different parts of the office, and select action buttons 335 as well utilizing the control panel 310 to provide the desired settings.

Figure 3D:
Figure 3E:
Figure 3F:

FIGS. 3*d*-3*f* show different digital twin views 307 of the office. Video feeds are stitched to the model to produce a real digital twin of the office. For example, video feeds are captured are stitched to the model to produce a real-life digital twin of the office as you would see it. In the case of a live digital twin, real-time video feeds are stitched to the model.

Figure 3G:
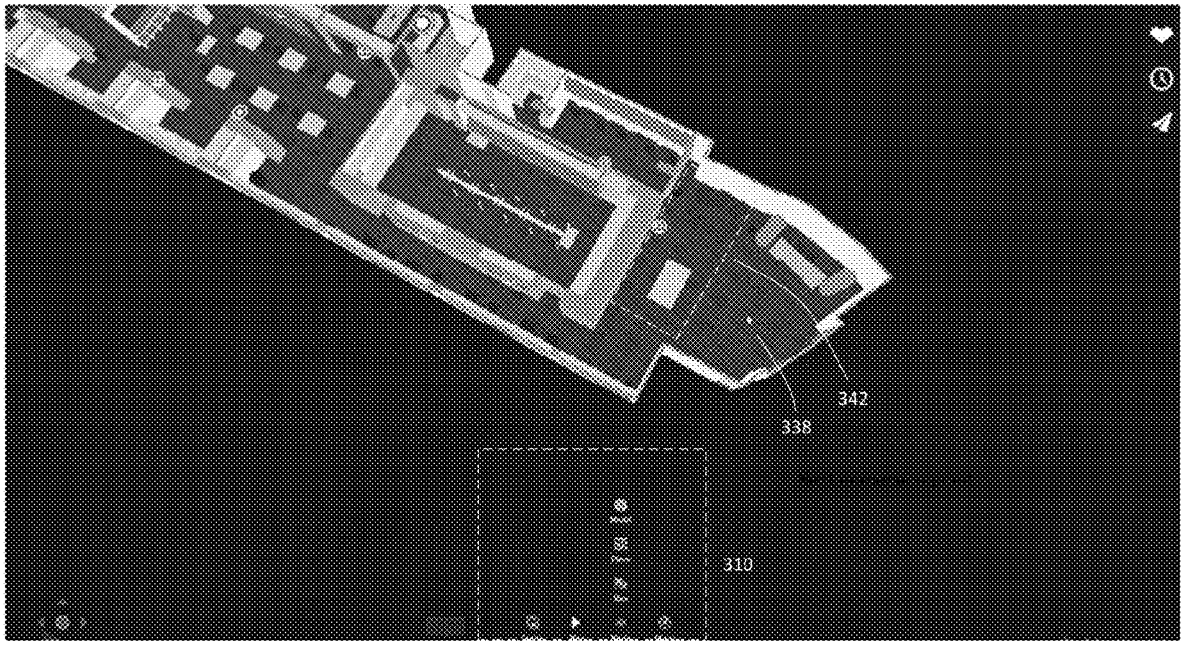
Figure 3H:
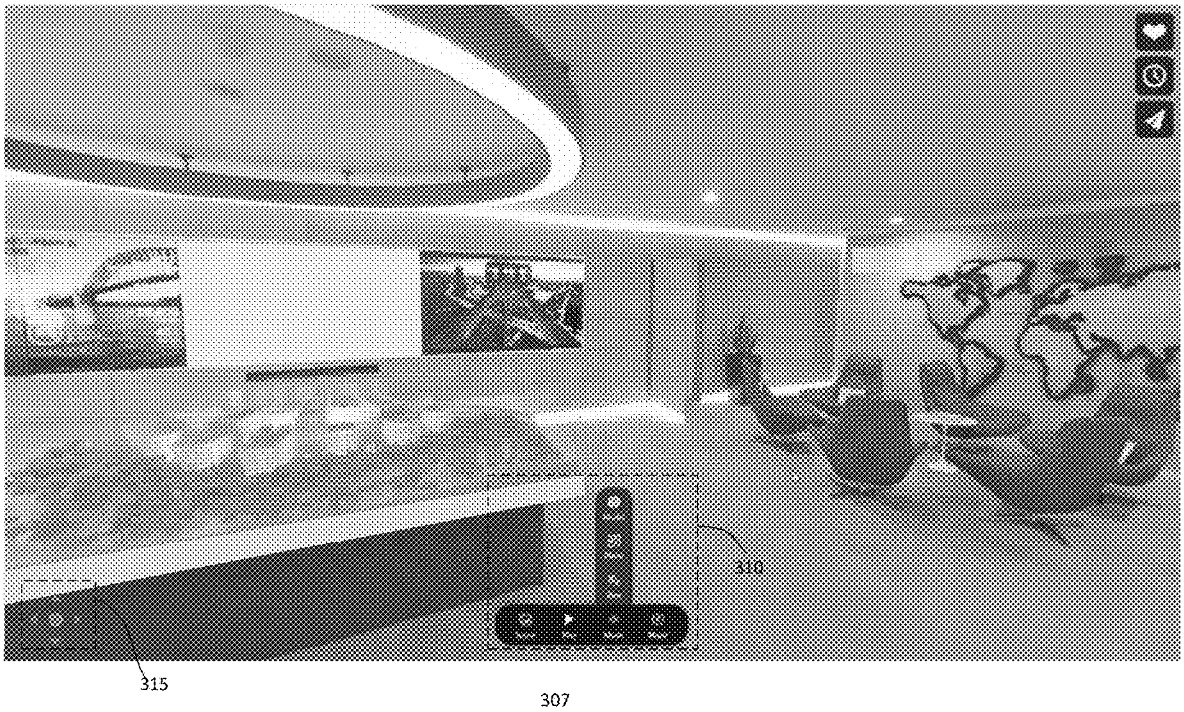

FIG. 3*g*-3*h* illustrates an example of navigating the digital twin system. Referring to FIG. 3*g*, the BIM model is displayed in the BIM mode. A user may navigate to an area 342 of the office using the mouse. For example, the cursor 338 may be navigated to the area of interest in the BIM model and click to select. The selected area is displayed. Other navigation techniques, such as the use of touch screen display, may also be employed.

Figure 3I:
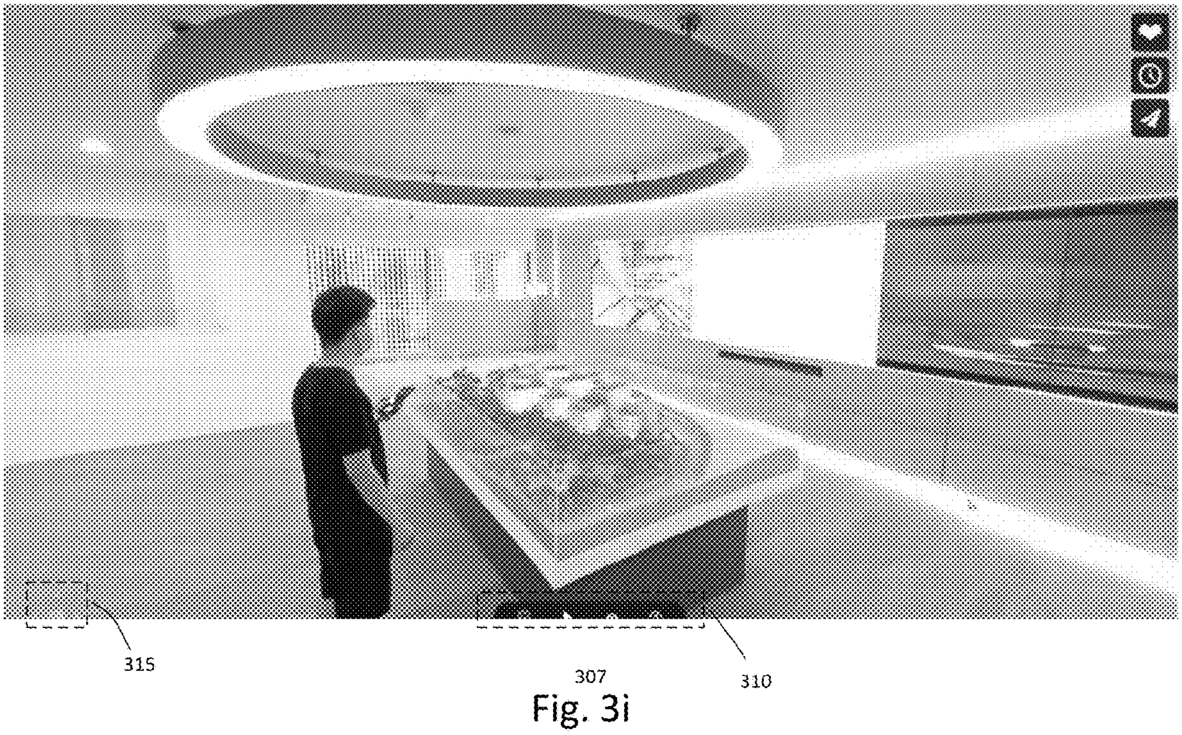

In FIG. 3*h*, the user switches to the live tour mode using the control panel 310. For example, the user selects the plane mode. This causes the live digital twin tour of the selected area to display on the user interface. For example, live video feeds of the selected area are stitched to the model. The user may use the cursor and a navigator 315 to rotate and move around the live digital twin, as depicted in FIG. 3*i*.

Figure 4A:
FIG. 4*a* shows a mesh model of an area of an embodiment of an interactive digital twin system.

FIG. 4*a* shows a mesh model 407 of a floor of a building 440. The mesh model is displayed on a user interface of the digital twin system. The digital twin system is similar to that already described. Common elements may not be described or described in detail. The user interface includes a control panel 410 to navigate the digital twin system.

As shown, the mesh model is generated from scanned data. The mesh model includes walls defining the interior space of the building. The building includes various rooms or areas, such as a lobby, conference rooms, office rooms and cafeteria. The building may include other areas. The areas, for example, depend on the actual building from which the scanned data is based or obtained. In one embodiment, the mesh model includes an interactive area 446 which a user can interact with elements therein. A user, for example, navigates to an area 442 outside of the interactive area using, for example, the mouse. The user selects the area by clicking on the mouse. The user may switch between different modes. For example, the user may switch from the BIM mode to the 3D tour mode or the live 3D tour mode using the control panel.

FIGS. 4*b-e* shows a user navigating through a 3D tour model 407 of the building. For example, the user may select the 3D tour model mode using the control panel. As discussed, the building includes an area 446.

Figure 4B:
FIGS. 4*b*-4*e* show various views of a user navigating and interacting with an embodiment of an interactive digital twin system.

Referring to FIG. 4*b*, it shows that the user has navigated to the area 442 outside of the interactive area 446. The area of the tour model reflects what is occurring in the area 442 and area 446 in real-time. For example, live video feeds are stitched into the tour model, creating a real-time or live digital twin. The live digital twin is displayed on the user interface. The live digital twin includes action buttons 435 for controlling components. For example, an action button controls a component on the tour model associated with it. The component can be any type of component, such as a video screen, a door, a robot or other types of components. When an action button is selected, such as by clicking a mouse or by other techniques, the component is activated. For example, when an action button is selected, a script associated with the action button is executed, causing a controller to control the compent. For example, the script can cause a door to open or close, a video screen to play, play different videos, or change channels to play the desired video. The action buttons provide the user interactivity with the live digital twin virtually.

Figure 4C:
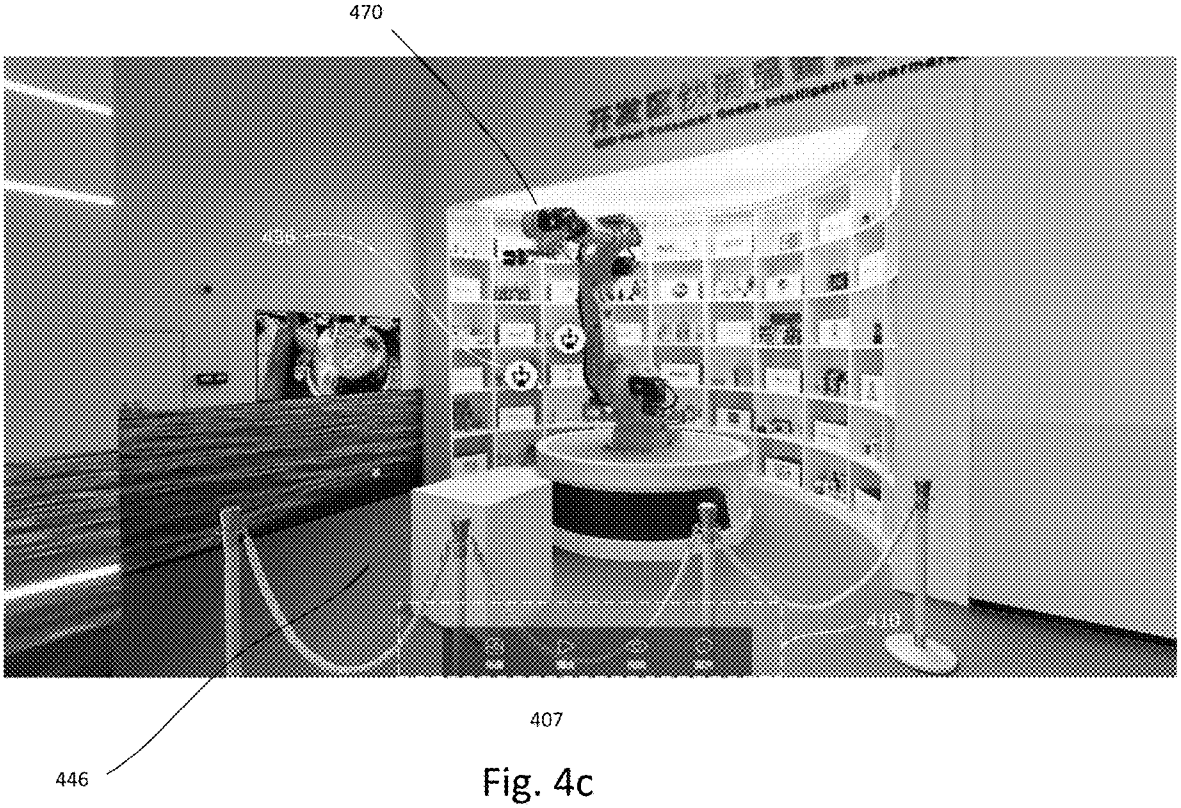
Figure 4D:
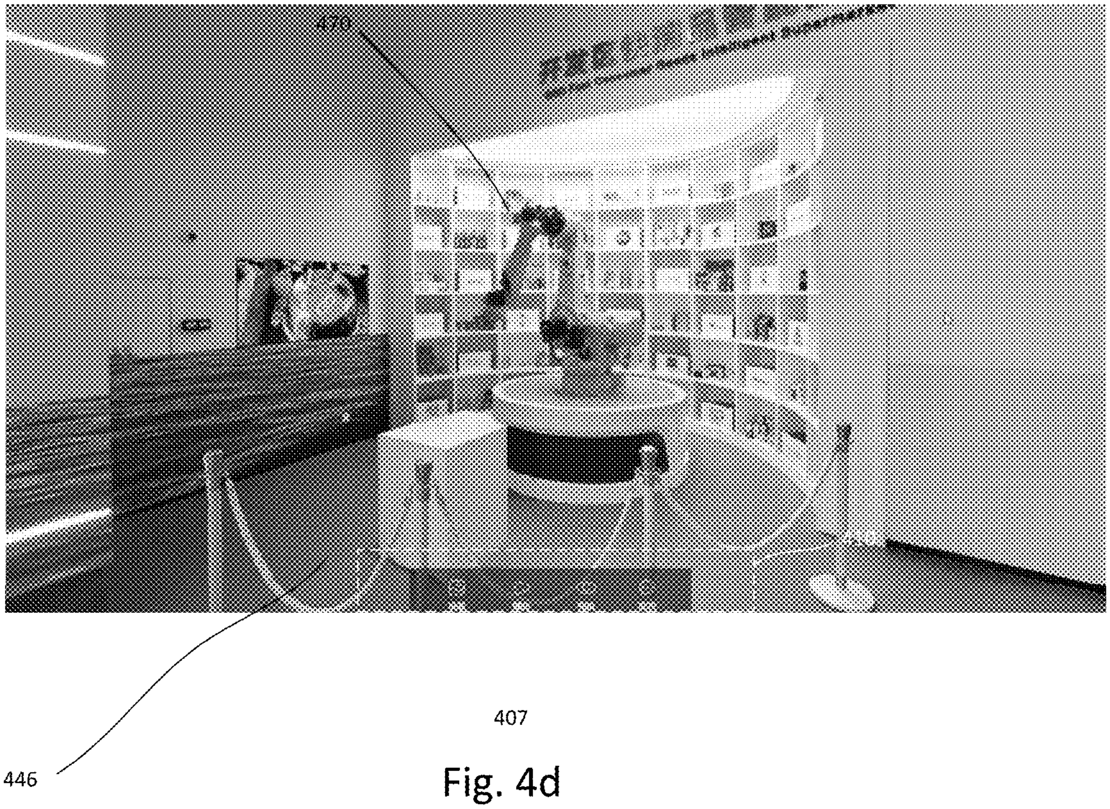
Figure 4E:
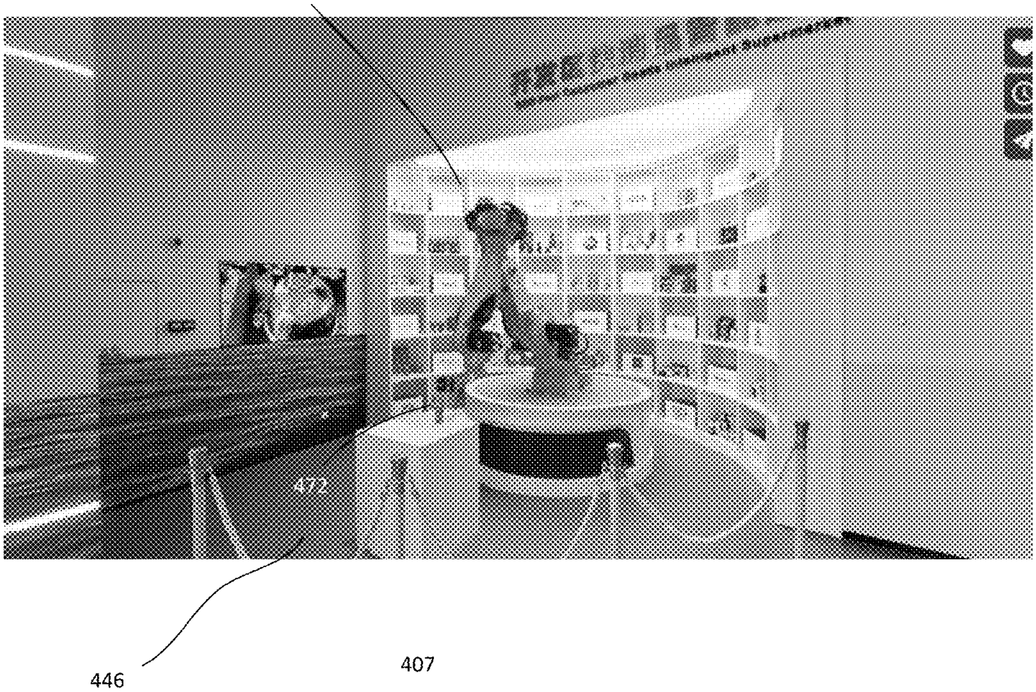

The user may navigate closer to the interactive area 446, as shown in FIG. 4*c*. As shown, the interactive area includes a robot 470 and a shelf with items displayed thereon. Furthermore, the shelf includes action buttons 436. The action buttons, for example, may be web buttons. Selecting an action button, for example, may cause a list of items contained in the section of the shelf to be display. The user may selecting an item on the list, activating the robot to pick up the selected item, as shown in FIG. 4*d*. In FIG. 4*e*, the robot removes the selected item 472 from the shelf and places on a display stand for viewing by the user. The user may decide to purchase the item if desired. For example, the user can select a purchase option from the drop down menu. Other techniques for enabling the user to select the purchase option may also be useful.

The example, as described, relates to controlling a robot to view and item and if desired purchase the item. The action buttons, as described, can be applied to other purposes, such as opening or closing a door, controlling what is displayed on a video screen as well as controlling other types of components.

The present disclosure may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

The present disclosure may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

The invention claimed is:

1. A system for displaying a 3D digital model of an indoor area comprising:
- a model module, the model module includes a BIM model, a textured 3D mesh model, a basic tour model and a live tour model, wherein
  - the BIM model is a 3D model of a scan of the indoor area (scanned indoor 3D model) with basic texturing,
  - the textured 3D mesh model is the scanned indoor 3D model with detailed texturing greater than the basic texturing,
  - the basic tour model includes feeds stitched to the scanned indoor 3D model to produce a static digital twin model of the indoor area, and
  - the live tour model includes live feeds stitched to the scanned indoor 3D model to produce a live digital twin;
- an input module, wherein the input module is configured to receive the live feeds of the indoor area from a plurality of cameras located in the indoor area;
- an integration module, wherein the integration module is configured to stitch the live feeds of the indoor area to the scanned indoor 3D model to create the live tour model;
- an interactive area disposed in the scanned indoor 3D model, wherein the interactive area includes an action button for controlling an interactive component, wherein the live feeds capture the interactive component being controlled by a user when the action button is selected;
- a display module for displaying a user interface, the user interface includes
  - a control module, the control module enables a user to control the system, the control module includes a control panel displayed on the user interface, the control panel includes
    - a model selector, the model selector enables the user to select one of the BIM model, the textured 3D mesh model, the basic tour model or the live tour model in the model module to display (selected model) on the user interface, and
    - a navigation controller, the navigation controller enables the user to navigate to different parts of the selected model displayed on the user interface.

2. The system of claim 1 wherein the cameras comprise multi-directional cameras.

3. The system of claim 1 wherein the cameras comprise cameras equipped with telephoto lenses for zooming in and out.

4. The system of claim 1 wherein the cameras are strategically located in the indoor area to capture the indoor area from any position and in any direction.

5. The system of claim 1 wherein the integration module is configured to stitch appropriate live feeds from any position and in any direction of the indoor area based on the user's location and direction as the user navigates the indoor area to provide an appropriate perspective of the indoor area to the user.

6. The system of claim 5 wherein the cameras are configured to zoom in and zoom out from any position and in any direction based on the movement of the user to provide appropriate live feeds as the user navigates within the indoor area.

7. The system of claim 1 wherein the live tour model includes live feeds stitched to the static digital twin model to produce the live digital twin.

8. The system of claim 7 wherein the integration module is configured to stitch a differential of the feeds and live feeds to the static digital twin model to produce the live digital twin model.

9. The system of claim 7 wherein the integration module is configured to stitch a differential of appropriate feeds and appropriate live feeds from any position and in any direction of the indoor area based on the user's location and direction as the user navigates the indoor area.

10. The system of claim 9 wherein the cameras are configured to zoom in and zoom out from any position and in any direction based on the movement of the user to provide the differential of the appropriate feeds and the appropriate live feeds as the user navigates within the indoor area.

11. A method for generating 3D models of an indoor area comprising:

scanning the indoor area to create a scanned indoor 3D model of the indoor area, wherein the scanned indoor 3D model includes an interactive area with an action button for controlling an interactive component;

placing cameras in the indoor area, the cameras are configured to capture live feeds of the indoor area;

generating a BIM model, a textured 3D mesh model, a basic tour model and a live tour model, wherein the BIM model is a 3D model of a scan of the indoor area (scanned indoor 3D model) with basic texturing, the textured 3D mesh model is the scanned indoor 3D model with detailed texturing greater than the basic texturing, and the basic tour model includes live feeds from the cameras in the indoor area which are stitched to the scanned indoor 3D model to produce a static digital twin model of the indoor area, and the live tour model includes live feeds stitched to the scanned indoor 3D model to produce a live digital twin;

selecting one of the BIM model, textured 3D mesh model, basic tour model or live tour model (selected model);

displaying the selected model;

navigating through different parts of the selected model; and selecting the action button to control the interactive component, wherein the live feeds capture the interactive component being controlled.

12. The method of claim 11 the cameras comprise multi-directional cameras.

13. The method of claim 11 wherein the cameras comprise cameras equipped with telephoto lenses for zooming in and out.

14. The method of claim 11 wherein the cameras are strategically located in the indoor area to capture the indoor area from any position and in any direction.

15. The method of claim 11 wherein the live tour model includes appropriate live feeds stitched from any position and in any direction of the indoor area based on the user's location and direction as the user navigates the indoor area to provide an appropriate perspective of the indoor area to the user.

16. The method of claim 11 wherein the cameras are configured to zoom in and zoom out from any position and in any direction based on the movement of the user to provide appropriate live feeds as the user navigates within the indoor area.

17. The method of claim 11 wherein the live tour model includes live feeds stitched to the static digital twin model to produce the live digital twin.

18. The method of claim 17 wherein a differential of the feeds and live feeds are stitched to the static digital twin model to produce the live digital twin model.

19. The method of claim 17 wherein a differential of appropriate feeds and appropriate live feeds from any position and in any direction of the indoor area based on the user's location and direction as the user navigates the indoor area.

20. The method of claim 19 wherein the cameras are configured to zoom in and zoom out from any position and in any direction based on the movement of the user to provide appropriate live feeds as the user navigates within the indoor area.

* * * * *